United States Patent [19]

Guillot

[11] 4,057,102
[45] Nov. 8, 1977

[54] ROTARY HEAT EXCHANGER, IN PARTICULAR FOR A GAS TURBINE

[75] Inventor: Jack Guillot, Juvisy sur Orge, France

[73] Assignee: Bennes Marrel, Zone Industrielle, Andrezieux Boutheon, France

[21] Appl. No.: 584,661

[22] Filed: June 6, 1975

Related U.S. Application Data

[62] Division of Ser. No. 418,803, Nov. 23, 1973, Pat. No. 3,985,181.

[30] Foreign Application Priority Data

Nov. 22, 1972  France .............................. 72.42150

[51] Int. Cl.² ............................................. F28D 19/00
[52] U.S. Cl. ..................................... 165/8; 64/27 C; 74/446
[58] Field of Search ............. 165/8; 64/27 C; 74/446, 74/447; 152/262-265

[56] References Cited

U.S. PATENT DOCUMENTS

| 986,549 | 3/1911 | Crawford et al. | 152/262 |
| 1,191,866 | 7/1916 | Amodeo-Salvator | 152/262 |
| 1,395,085 | 10/1921 | Bibb | 152/262 |
| 3,789,917 | 2/1974 | Jarry | 165/8 |
| 3,794,109 | 2/1974 | Hughes | 165/8 |

Primary Examiner—Albert W. Davis, Jr.
Attorney, Agent, or Firm—Sughrue, Rothwell, Mion, Zinn and Macpeak

[57] ABSTRACT

The invention relates to a rotary heat exchanger.

Springs 18, or compressed air, housed between the steel rim 2 and the cellular ceramic disk 1, exert a compressive prelateral tightness over about one-third of the surface, for the passing of the cool air of admission. The remainder of the disk is passed through by hot exhaust gases. A gas turbine, in particular for a lorry, wherein the disk 1 is subjected to abrupt accelerations and decelerations.

1 Claim, 7 Drawing Figures

ROTARY HEAT EXCHANGER, IN PARTICULAR FOR A GAS TURBINE

This is a division of application Ser. No. 418,803 now U.S. Pat. No. 3,985,181, filed Nov. 23, 1973.

The present invention relates to a rotary heat exchanger intended to be fitted, for instance, to a gas turbine.

It is known that a heat exchanger of such a type is constituted by a disk of porous ceramic material mounted within a steel rim, the latter playing a double part, to wit:

it runs on rollers fixedly mounted and distributed around it, so as to ensure the centering of the ceramic disk during the rotation of the latter:

it is provided with external peripheral teeth with which a driving pinion meshes, this pinion being intended for relatively driving the exchanger.

It is known that the rotary ceramic disk is transversely interposed in the path of two juxtaposed lines, to wit, an air line, the section of which affects a sector of about 120° on the plane surface of the disk, and an exhaust gas line, the section of which affects a sector of about 240°. In the exchangers known heretofore, care is taken to ensure the tightness of the two opposite ends of the gas exhaust line on the flat faces of the disk. To this end, friction members or shoes are used, which are disposed end to end and bear against the lateral faces of the rotary ceramic disk.

Such known arrangements have various drawbacks, which are particularly noticeable when the exchanger is fitted to the gas turbine of a lorry or vehicle. As a matter of fact, such a gas turbine may be subjected to instantaneous speed variations which are sometimes very abrupt, which results in tensile and shearing stresses in the ceramic material of the disk. In fact, this disk is comparatively heavy, and opposes the accelerations with a substantial inertia effect. The accelerations are transmitted by the driving mechanism to the outer part of the steel rim, which acts in turn on the periphery of the ceramic material. It is chiefly in its peripheral area that the ceramic material is subjected to tensile and shearing stresses, all the more so as the steel rim is substantially expanded by the heat, whereas the ceramic material of the disk has a coefficient of expansion of zero, or even negative.

Another drawback in the known exchangers results from the fact that the abrupt variations in speed of rotation and load to which a gas turbine is subjected when mounted on a lorry, give rise to varying and dissymmetric thermal stresses in the ceramic material of the disk of the exchanger. Thus, the lateral faces of the disk (which pass across the hot exhaust gas line and the line of admission of comparatively cool air, alternatively) are subjected to distortions and bucklings, so that the friction shoes do not bear sealingly on said faces. As a result, internal leaks occur, which hamper the efficiency of the turbine.

The object of the present invention is to obviate such drawbacks by improving the working conditions for the ceramic material of the exchanger disk, and, besides, the quality of the tightness on the faces of said disk.

It is known that ceramic material is brittle, and does not withstand shearing and, in particular, tensiles stresses very well. On the contrary, it is able to withstand compression stresses, even substantial ones, without any damage.

The present invention is chiefly based on the existence of this fact.

A rotary heat exchanger according to the invention includes a disk of porous ceramic material, received within a steel rim to which it is connected by driving means, and is characterized in that it includes, besides, means positioned between the steel rim and the periphery of the ceramic disk, which means exert a pre-stress of radial compression on said periphery at all times, so that at all points of the disk the ceramic material works permanently under compression conditions, whatever may be the speed of rotation and the working lead of the turbine.

According to another feature of the invention, the means for compressing the ceramic material are constituted by springs compressed between the inner wall of the rim and the outer cylindrical wall of the ceramic disk.

According to a modified embodiment, the means for compressing the ceramic material are constituted by an annulus of compressed air confined between the inner wall of a steel rim and the outer wall of the ceramic disk, lateral sealing means being disposed between said walls, while the supply of compressed air to the annular cavity thus defined is ensured from the air admission line on which the exchanger disk is interposed. In this case, a tightness arrangement is provided between the plane faces of the disk and the opposite ends of the air admission line, the friction members which ensure such tightness being distributed over each face of the disk, approximately along the contour of a sector, the central portion of which surrounds the center of the disk, the latter having an axial port connected with the peripheral cavity for compressed air through radial channels distributed through the thickness of the porous ceramic. Thus, the tightness on the lateral faces of the disk is achieved round the air admission line, and no longer round the exhaust gas line as in the known devices. This arrangement is particularly advantageous: it has to ensure the tightness only over a circular sector of about 120°, instead of a sector of about 240° in the known devices. The tightness is achieved in a sector having a smaller surface and in which, besides, the temperature is the lowest of the cycle of operation, since it is the temperature of the cool air of admission: this is advantageous in that the heat distortion of the faces of the disk is at a minimum in said area.

According to another feature of the invention, the two annular gaskets ensuring the tightness of the compressed air chamber between the steel rim and the ceramic disk are constituted each by a ring of a ductile material such as copper, brass, or asbestos, which ring is radially applied on the outside of the ceramic disk by radial springs bearing on the inside of the steel rim, and/or applied axially against the inner face of a lateral flange of said steel rim by springs axially directed and bearing on another inner flange of the steel rim, said other flange being provided on the other side of the gasket.

According to a modified embodiment, each annular gasket disposed between the steel rim and the ceramic disk is constituted by a helical spring having the general shape of a torus, around which a flexible metal sheet is rolled, the opposite lips of said metal sheet defining a circular slit which opens towards the other gasket, that is, into the inside of the annular chamber for compressed air.

According to another feature of the invention, a metal tie-rod is disposed inside the central hole in the disk, which tie-rod connects the outer cover of the turbine to a stationary inner frame located on the other face of the disk, the ceramic material of the latter turning freely, with a substantial radial play, round said fixed metal tie-rod. This substantial radial play is used for creating a circulation of air which acts, on the one hand, for supplying air to the peripheral annular chamber to compress the ceramic material pneumatically, and, on the other hand, for cooling the metal tie-rod. To improve this latter feature, channels are preferably provided, which are drilled in that end of the tie-rod which is screwed in the frame of the turbine, so as to create a small leaking flow of air from the axial interstice of the disk, which flow passes through the fixing end of the tie-rod and cools it, before going to mix with the flow flow of burnt gases sent back over one of the wheels of the turbine. Thus, the cooling of the metal tie-rod is achieved by means of a flow of air which does not correspond to a loss through an internal leak, since it is recovered by making it work on one of the wheels of the turbine.

The accompanying drawing, given by way of non-limitative example, will enable the features of the invention to be clearly understood.

FIGS. 1–3 illustrate a rotary heat exchanger, which includes:

Figure 1:
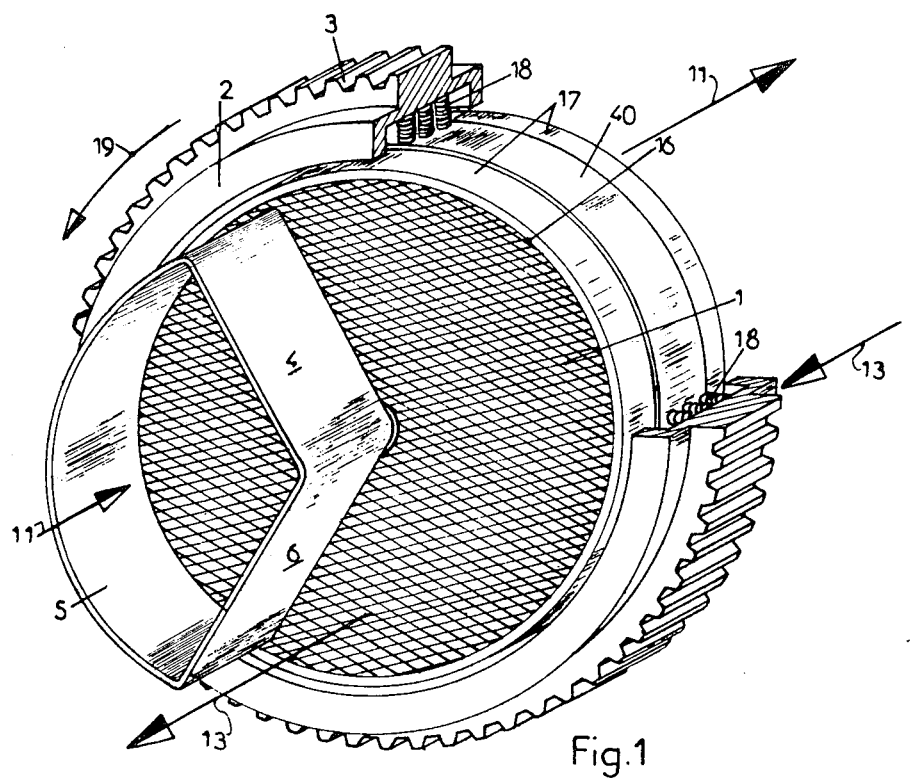
FIG. 1 is a perspective view, partly in section, of a rotary heat exchanger according to the invention.
Figure 2:
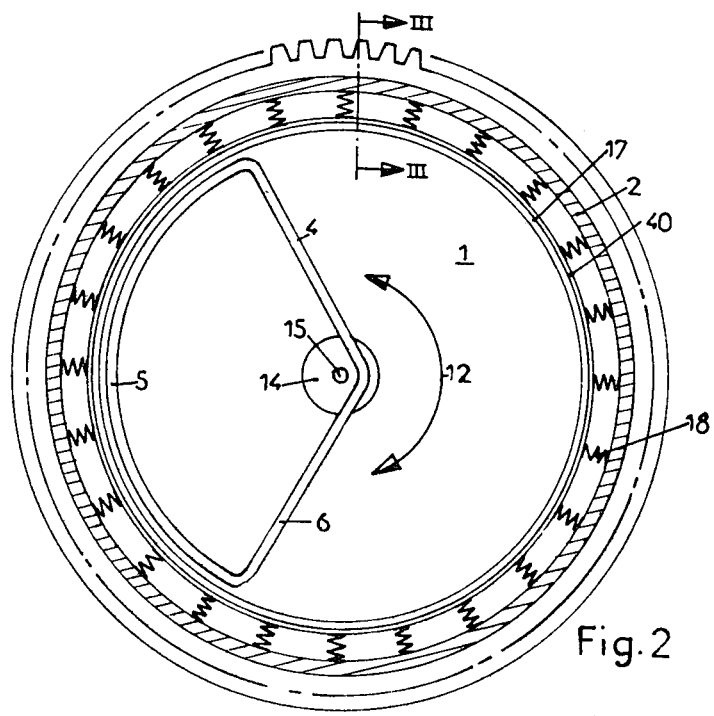
FIG. 2 is a front view thereof.

a disk 1 of cellular, porous ceramic material, a rim 2 made of steel, the periphery of said rim being provided with teeth 3, which drive it rotatingly, an arrangement of sealing shoes known per se, and distributed along a contour 4, 5, 6, the novelty of which consists in defining roughly a circular sector with an angle of about 120° with respect to the center.

Sealing shoes are applied on one face 7 of the ceramic disk 1 (FIG. 3), and define the closed contour 4, 5, 6. Oppositely, that is, on the opposite face 8 of the disk, similar shoes are disposed, which are distributed along a similar closed contour 4, 5, 6. Thus, the disk 1 is interposed between the two sections 9 and 10 of a line inside which air of admission circulates in the direction of the arrows 11, the two sections 9 and 10 lying end to end.

On the contrary, the remaining area of the surface of the ceramic disk 1 (that is, roughly, a sector, the angle 12 of which is about 240° with respect to the center), is interposed between the aligned sections of a line inside which exhaust gases circulate in the opposed direction, as indicated by the arrows 13.

By way of information, the gas flows may correspond to the following characteristics:

A. Air circulating in the direction of arrows 11 upstream of disk 1: absolute pressure, 4 bar; temperature, 195° C.

downstream of disk 1: absolute pressure, 3.9 bar; temperature, 598° C.

B. Exhaust gases circulating in the direction of arrows 13 upstream of the ceramic disk 1: absolute pressure, 1.05 bar; temperature 655° C.

downstream of the ceramic disk 1: absolute pressure, 1 bar; temperature 252° C.

The disk 1 has its central portion provided with a core 14 of non-porous ceramic material. An axial hole 15 is drilled in said core 14, and opens inside the sealing contour defined by the shoes 4, 5, 6. Thus, a circulation of air can take place through the hole 15, as will be explained in a detailed way hereinafter.

According to the invention, the periphery 16 of the ceramic material of disk 1 is fully smooth and cylindrical, without any machining. This periphery is surrounded by a lining 17 made of a deformable refractory material such as asbestos. This lining 17 is in turn hooped by one or more metallic collars 40. A great number of small springs 18 are disposed between said lining 17 and the steel rim 2, these srings being in compression. By way of example, three springs 18 may be juxtaposed in line along a generatrix of the cylindrical surface 16, such sets of three springs being evenly distributed according to thirty-nine generatrices all around the disk 1. thus, three hundred and fifty-one springs 18 are housed between the rim 2 and the disk 1, the ceramic material of the latter being subjected at all times to compression stresses directed radially, that is, towards the center 15.

Owing to this arrangement, when the rim 2 is rotatingly driven in the direction of the arrow 19, the instantaneous angular accelerations bring about more or less substantial reductions of this pre-stress, while they never cancel the latter, however. Finally, the cellular ceramic material of the disk 1 is permanently subjected to compression stresses, the intensities of which are variable.

Figure 3:
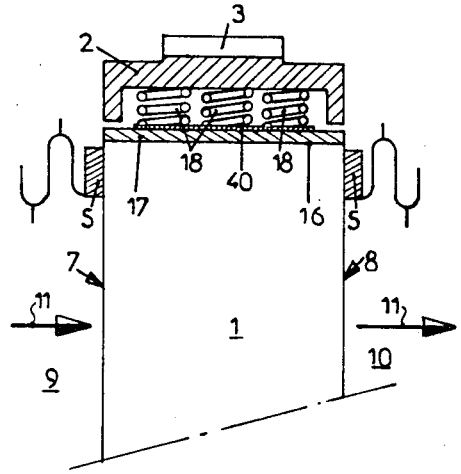
FIG. 3 is a sectional view along line III—III of FIG. 2.
Figure 4:
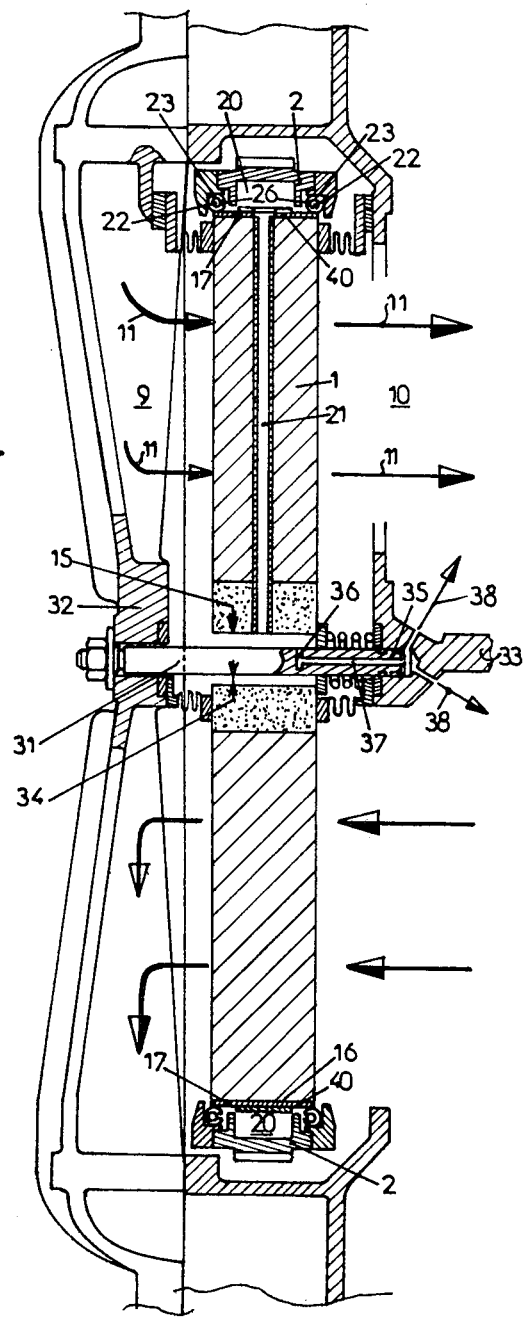
FIG. 4 shows an axial section of a modified, pneumatically operated embodiment.
Figure 5:
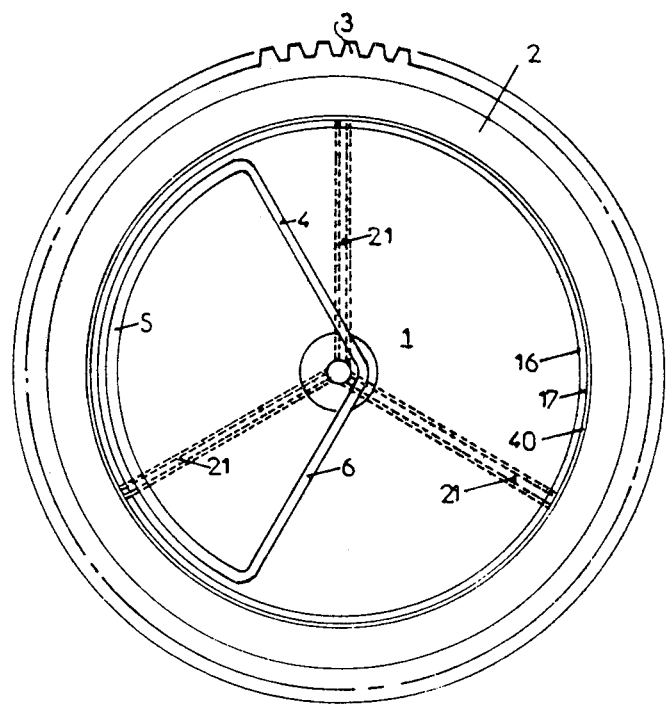
FIG. 5 is a front view of the embodiment shown in FIG. 4.
Figure 6:
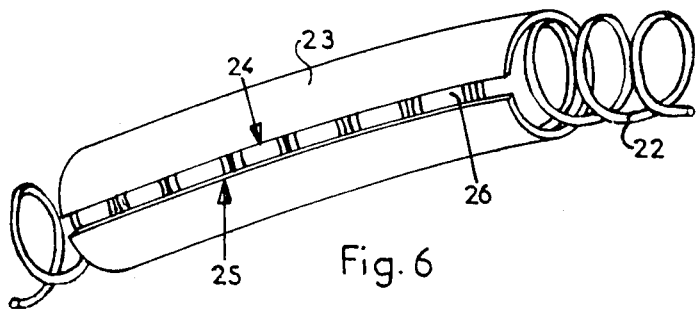
FIG. 6 is a diagrammatic detailed view of a gasket.

FIGS. 4 and 5 illustrate a modified embodiment, wherein a radial compression of the ceramic material is obtained by disposing between the steel rim 2 and the disk 1 a fluid-tight annular chamber 20 which contains compressed air at all times. Such air pressure is obtained from the upstream section 9 of the admission air line. Said section 9 contains air at a pressure of four bar, which air passes through the central hole 15 in the ceramic materail, and enters the annular chamber 20 through radial communication tubes 21 provided in the thickness of the disk 1. These radial tubes 21 may be three in number, as shown in FIG. 3.

The lateral tightness of the chamber 20 is ensured by two torusshaped gaskets, each of which is constituted by a helical spring 22 around which a flexible metal sheet, made, for instance, of nickelchromium, is wound. The opposite lips 24 and 25 of the metal sheet 23 define a circular slit 26 which faces the inside of the chamber 20. In other words, the slits 26 of the two lateral gaskets are directed towards each other, so that the air pressure is built up inside the gaskets, and tends to make the tightness complete by keeping the flexible sheets 23 resting on the faces of the steel rim 2 and the ceramic material 1, or the abestos covering 17 of the latter.

This arrangement is advantageous in that the air pressure which prevails in the annular chamber 20 may vary depending on the operating conditions and lead of the turbine. Thus, the value of the radial prestress of compression exerted on the ceramic material of the disk 1 varies with the load on the turbine, and adjusts itself thereto automatically.

Figure 7:
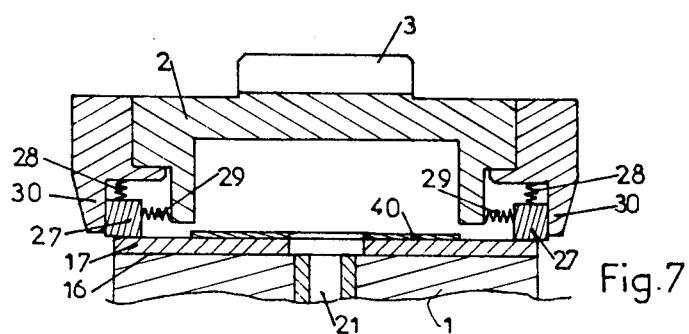
FIG. 7 shows a modified gasket for the pneumatic arrangement of FIGS. 4 and 5.

FIG. 7 shows a modified embodiment, wherein the lateral tightness is ensured by an annular seal 27, the cross-section of which may be square or rectangular. Radially directed springs 28 and axially directed springs 29 bear on flanges of the rim 2 to keep said seal 27 bearing:

on the outside of the ceramic disk 1, or on the asbestos covering 17, on the one hand, on a lateral flange 30 provided on the side of the rim 2, on the other hand.

In all cases, it is advantageous to use the central hole 15 in the ceramic disk 1 to insert a tie-rod 31, made of metal, which connects an outer cover 32 to the inner body or stationary frame 33 of the turbine. This tie-rod 31 prevents the cover 32 from swelling under the action of the internal gas pressure.

A substantial radial play 34 is defined round the tie-rod 31, so that an annular interstice remains free and enables the air to circulate through the hole 15. The tie-rod 31 is provided with inner drilled holes 36 and 37 near its fixing end 35, which holes define a slight air leak which ensures the internal cooling of the tie-rod. Said air leak is then mixed with the flow of combustion gases, as indicated by the arrows 38.

What is claimed is:

1. A rotary heat exchanger for a gas turbine comprising a disc of cellular ceramic material having a peripheral lining of refractory material, a smooth metallic collar surrounding said lining in engagement therewith, an annular driving rim having a smooth radially inward surface surrounding said collar in radial spaced relation and a plurality of annular rows of radially disposed springs disposed in compression between said rim and said collar for transmitting driving torque from said rim to said collar and said disc.

* * * * *